(12) United States Patent
Bizzi et al.

(10) Patent No.: US 8,499,806 B2
(45) Date of Patent: Aug. 6, 2013

(54) PNEUMATIC TIRE HAVING AN ASYMMETRIC TREAD PROFILE

(75) Inventors: Stefano Bizzi, Milan (IT); Maurizio Boiocchi, Milan (IT); Giuseppe Matrascia, Milan (IT); Dario Scaltritti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 751 days.

(21) Appl. No.: 12/085,695

(22) PCT Filed: Dec. 20, 2005

(86) PCT No.: PCT/EP2005/056974
§ 371 (c)(1),
(2), (4) Date: Jul. 13, 2010

(87) PCT Pub. No.: WO2007/071284
PCT Pub. Date: Jun. 28, 2007

(65) Prior Publication Data
US 2010/0294408 A1    Nov. 25, 2010

(51) Int. Cl.
*B60C 11/01*   (2006.01)
(52) U.S. Cl.
USPC .............. 152/209.16; 152/209.14; 152/209.8; 152/455
(58) Field of Classification Search
USPC .................. 152/209.1, 209.8, 209.9, 209.14, 152/209.16, 455, 456
See application file for complete search history.

(56) References Cited

U.S. PATENT DOCUMENTS

| | | | | | |
|---|---|---|---|---|---|
| 3,435,874 | A | * | 4/1969 | Mirtain et al. | 152/209.8 |
| 4,840,210 | A | * | 6/1989 | Kukimoto | 152/209.9 |
| 4,905,748 | A | * | 3/1990 | Kukimoto et al. | 152/209.5 |
| 5,971,048 | A | | 10/1999 | Ashmore et al. | |
| 6,508,284 | B1 | * | 1/2003 | Swift et al. | 152/456 |
| 2003/0121582 | A1 | | 7/2003 | Niwa et al. | |

FOREIGN PATENT DOCUMENTS

| | | |
|---|---|---|
| EP | 0 755 808 A2 | 1/1997 |
| EP | 0 820 884 A2 | 1/1998 |
| EP | 0 928 680 A1 | 7/1999 |
| EP | 0 928 702 A1 | 7/1999 |
| JP | 9-300906 | 11/1997 |
| JP | 2002-307912 | * 10/2002 |
| JP | 2004-359078 | * 12/2004 |

OTHER PUBLICATIONS

JP 2002-307912, Oct. 2002, English language machine translation, retrieved from internet [http://www4.ipdl.inpit.go.jp/Tokujitu/PAJdetail.ipdl?N0000=60&N0120=01&N2001=2&N3001=2002-307912].*

* cited by examiner

*Primary Examiner* — Eric Hug
(74) *Attorney, Agent, or Firm* — Finnegan, Henderson, Farabow, Garrett & Dunner, L.L.P.

(57) ABSTRACT

A tire having (i) an asymmetric tread profile with a shoulder drop difference of 0.3 to 0.9; and (ii) an asymmetric tread pattern so as to have a ratio between the inner void/solid ratio and the outer void/solid ratio of 1.1 to 1.50. By the above combination of features, handling and aquaplaning performance is remarkably improved even at high operating speeds without negatively affecting the wear resistance of the tread band.

14 Claims, 1 Drawing Sheet

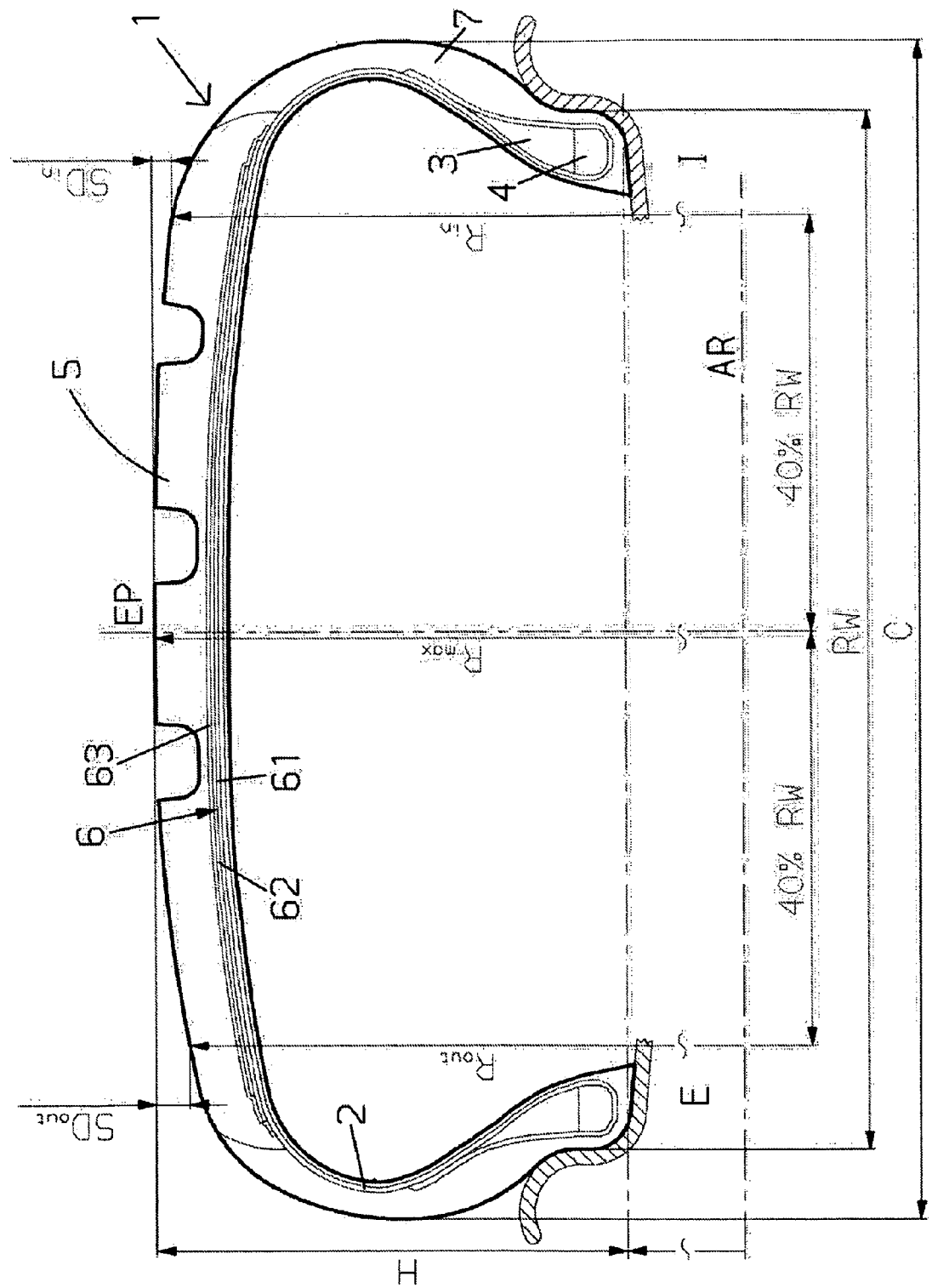

PNEUMATIC TIRE HAVING AN ASYMMETRIC TREAD PROFILE

CROSS REFERENCE TO RELATED APPLICATION

This application is a national phase application based on PCT/EP2005/056974, filed Dec. 20, 2005, the content of which is incorporated herein by reference.

BACKGROUND OF THE INVENTION

1. Field of the Invention

The present invention relates to a pneumatic tire, particularly to a high or ultra high performance pneumatic tire, having an asymmetric tread profile.

2. Description of the Related Art

A pneumatic tire generally comprises: a torodial carcass structure comprising at least one carcass ply; a tread band in a position radially external to the carcass structure; a belt structure interposed between the carcass structure and the tread band; a pair of sidewalls applied to the carcass structure in axially opposite positions. The ends of the at least one carcass ply are associated to respective annular reinforcing elements so as to form tire beads, which secure the tire to a wheel rim.

Generally, a tire has a symmetric tread profile, i.e. the tread profile, considered in a cross-section lying on a tire radial plane, has a symmetric shape with respect to the equatorial plane of the tire. To improve performance of tires to be used in high-powered cars, particularly during cornering at high speeds, asymmetric tread profiles have been proposed in the art.

For instance, EP 0 755 808 B1 discloses a pneumatic tire comprising a carcass extending around the tire from bead to bead, sidewalls and a rubber tread region which has a profile when considered in transverse cross section of a new tire terminating the sides of the tread in inner and outer shoulder regions respectively, each said shoulder region having a shoulder drop, which is the distance in the radially inward direction from the point of maximum tire diameter to a shoulder point at the edge of the shoulder region, characterized in that when the tire is mounted on a scheduled wheel rim and inflated to a scheduled pressure, the tread region is asymmetric having its said point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetrical profile.

EP 0 820 884 B1 discloses a pneumatic radial tire comprising a carcass extending around the tire from bead to bead, sidewalls and a rubber tread region which has a profile when considered in transverse cross section of a new tire terminating at the sides of the tread in inner and outer shoulder regions respectively, each said shoulder region having a shoulder drop, which is the distance in the radially inward direction from the point of maximum tire diameter to a shoulder point at the edge of the shoulder region, such that when the tire is mounted on a scheduled wheel rim and inflated to a scheduled pressure, the tread region is asymmetric having its said point of maximum tire diameter offset in the axial direction of the tire from the center line of the tire section in the direction of the inner shoulder, and the shoulder drop of the outer shoulder is greater than the shoulder drop of the inner shoulder such that the tread region has an asymmetrical profile, characterized by the tread region having substantially constant tread gauge or thickness except at the inner shoulder which has a locally reduced tread gauge or thickness so that the inner shoulder profile is trimmed.

US 2003/0121582 A1 discloses a pneumatic radial tire having a tire meridian cross-sectional configuration of a tread surface portion on at least one side of the tire center line which is arranged such that, when a position A is an intersection of the tire center line and the tread surface, and when a position B is an intersection of a straight line P drawn orthogonal to the tire axis from an edge of an innermost belt layer and the tread surface, an angle $\alpha$ between a straight line X connecting the positions A and B and a straight line Y drawn perpendicular to the tire center line from the position A is set in a range of 8 to 10 degrees, when the pneumatic radial tire is attached to a standard rim specified in JATMA with its air pressure being 180 kPa and with no load applied thereto.

SUMMARY OF THE INVENTION

In accordance with the present invention the following definitions are given:

"equatorial plane" EP is the plane perpendicular to the tire rotational axis and containing the axial centerline of the tire;

"camber angle" is the smallest angle defined, for a tire mounted on a vehicle rim, by rotating the equatorial plane of tire until overlapping the plane perpendicular to the ground and passing through the tire center; the camber angle is said to be "negative" when the upper portion of the tire mounted on the rim is inclined inwardly (i.e. toward the vehicle);

"rim width" RW is the smallest internal distance, measured parallel to the rim rotational axis, between the portions (flanges) of the rim on which the tire is mounted;

"shoulder drop" SD is the difference between the length of the maximum tire radius $R_{max}$ and the length of the tire radius at a distance, from the tire equatorial plane, corresponding to 40% of the rim width $R_{in}$ and $R_{out}$; any tire radius is measured from the radially outward tread profile perpendicularly to the tire rotational axis, on the tire mounted on the corresponding rim, inflated at the nominal inflation pressure and not subjected to any load;

"inner tread portion" is the portion of the tread extending from the equatorial plane to the tire shoulder positioned inwardly with respect to the vehicle when the tire is mounted on the vehicle rim;

"outer tread portion" is the portion of the tread extending from the equatorial plane to the tire shoulder positioned outwardly with respect to the vehicle when the tire is mounted on the vehicle rim;

"inner shoulder drop" $SD_{in}$ is the shoulder drop of the inner tread portion;

"outer shoulder drop" $SD_{out}$ is the shoulder drop of the outer tread portion;

"shoulder drop difference" $\Delta SD$ is the difference between the outer shoulder drop and the inner shoulder drop:

$$\Delta SD = SD_{out} - SD_{in}$$

$\Delta SD$ is zero for a symmetrical tread profile and is different from zero for an asymmetrical tread profile;

"void/solid ratio" V/S is the ratio between the free volume in the tread band (i.e. the volume of grooves, sipes and other carvings forming the tread pattern) and the volume occupied by the rubber material in the tread band, namely:

$$V/S = \frac{V_{void}}{V_{rubber}} = \frac{V_{void}}{V_{tread} - V_{void}}$$

wherein: $V_{void}$ is the void volume in the tread band occupied by the tread pattern carvings (grooves, sipes, notches and the like); $V_{rubber}$ is the volume in the tread band occupied by the rubber material; and $V_{tread}$ is the total volume of the tread band (the volumes are calculated with respect to the lower surface of the tread band in contact with the underlying belts and the upper surface of the tread band obtained by connecting the tread pattern protrusions coming into contact with the ground—blocks, ribs and the like—to form a slick surface, i.e. without taking into account the tread pattern carvings); the void/solid ratio can be determined for the whole tread band or for a portion thereof.

"inner void/solid ratio" $(V/S)_{in}$ is the ratio between the free volume in the inner tread portion (i.e. the volume of grooves, sipes and other carvings forming the inner tread pattern) and the volume occupied by the rubber material in the inner tread portion;

"outer void/solid ratio" $(V/S)_{out}$ is the ratio between the free volume in the outer tread portion (i.e. the volume of grooves, sipes and other carvings forming the inner tread pattern) and the volume occupied by the rubber material in the outer tread portion.

The Applicant has felt the need of increasing the performance of high performance (HP) and ultra high performance (UHP) tires, these tires being designed for high-powered cars. In particular, the Applicant has felt the need of improving the performance of such tires both in terms of handling and in terms of aquaplaning, especially aquaplaning along bends. This performance should be improved at relatively low speeds (i.e. not higher than 150 km/h) and substantially maintained at relatively high speeds (i.e. higher than 150 km/h) and/or in extreme driving conditions, which are often reached when high-powered cars are tested or used.

Moreover, the Applicant has noticed that usually high-powered cars require tires with a camber angle different from zero, usually a negative camber angle, so as to improve their performance during bending at high speeds. However, a camber angle different from zero (e.g. from -4.5° to +4.5°) may cause an uneven wear of the tread band, especially when running at relatively low speeds on a straight road.

The Applicant has found that handling and aquaplaning performance is remarkably improved even at high operating speeds without negatively affecting the wear resistance of the tread band, by providing the tire with a combination of an asymmetric tread profile having a shoulder drop difference ($\Delta$SD) of from 0.3 to 0.9; and an asymmetric tread pattern so as to have a ratio between the inner void/solid ratio $(V/S)_{in}$ and the outer void/solid ratio $(V/S)_{out}$ of from 1.1 to 1.50.

Therefore, according to a first aspect, the present invention relates to a pneumatic tire comprising: a toroidal carcass structure comprising at least one carcass ply, said carcass structure comprising a crown portion and two axially opposite side portions, each associated to a respective bead structure for mounting the tire on a rim; a tread band in a position radially external to the carcass structure; a belt structure interposed between the carcass structure and the tread band; a pair of sidewalls applied to the carcass structure in axially opposite positions;

wherein said tire has an equatorial plane which divides the tread band into an inner tread portion and an outer tread portion, the inner tread portion being positioned inwardly and the outer tread portion being positioned outwardly when the tire is mounted on the rim;

wherein the inner tread portion has an inner shoulder drop $SD_{in}$, and the outer tread portion has an outer shoulder drop $Sp_{out}$, each shoulder drop being measured as the difference between the length of the maximum tire radius $R_{max}$ and the length of the tire radius at a distance, from the tire equatorial plane, corresponding to 40% of the rim width;

wherein the inner tread portion has an inner void/solid ratio $(V/S)_{in}$ and the outer tread portion has an outer void/solid ratio $(V/S)_{out}$ different from the inner void/solid ratio $(V/S)_{in}$;

wherein said tire has:
 (i) an asymmetric tread profile so as to have a shoulder drop difference $\Delta$SD, calculated as the difference between the outer shoulder drop and the inner shoulder drop, of from 0.30 mm to 1.30 mm; and
 (ii) an asymmetric tread pattern so as to have a ratio between the inner void/solid ratio $(V/S)_{in}$ and the outer void/solid ratio $(V/S)_{out}$ of from 1.10 to 1.50.

BRIEF DESCRIPTION OF THE DRAWING

Further features and advantages will become more apparent from the detailed description of preferred but non-exclusive embodiments of a tire in accordance with the present invention. The present description should be taken with reference to the sole accompanying drawing, given as specific, non limiting example of the present invention.

In the drawing:

FIG. 1 schematically shows a cross-section of a tire according to the present invention with an asymmetric tread profile.

DETAILED DESCRIPTION OF THE INVENTION

With reference to FIG. 1, a tire 1 according to the present invention conventionally comprises a torodial carcass structure 2, which comprises a crown portion and two axially opposite side portions, each associated to a respective bead structure for mounting the tire on a rim. Each bead structure usually comprises a bead wire 4 and a bead filler 3 and is associated to the carcass structure by folding back the opposite lateral edges of the carcass ply 2 around the bead wires so as to form the so-called carcass back-folds as shown in FIG. 1.

Alternative bead structures are shown, for instance, in European patent applications EP 0 928 680 and EP 0 928 702, where each bead structure is formed by at least two annular inserts formed from metal cords arranged in concentric coils, and the carcass ply is not back-folded around said annular inserts.

A tread band 5 is circumferentially applied in a position radially external to the crown portion of the carcass structure 2.

The tire 1 further comprises a belt structure interposed between the carcass structure and the tread band. Usually the belt structure comprises two belt layers 61, 62 which incorporate a plurality of reinforcing cords (not shown), typically metal cords, which are parallel to each other in each layer and crossed with respect to the adjacent layer in opposite directions, so as to form a predetermined angle relative to the equatorial plane. Usually, on the radially outermost belt layer at least one zero-degree reinforcing layer 63 is applied, which generally incorporates a plurality of reinforcing cords (not shown), typically textile cords, arranged at an angle of a few degrees relative to the equatorial plane EP. The inner structure of the tire according to the invention, comprising said carcass structure and said belt structure, is symmetric with respect to the equatorial plane EP.

Sidewalls 7 are also applied externally onto each axially opposite side portion of the carcass structure, each of these sidewalls extending from the respective bead structure to the edge of the tread band 5.

Preferably, the tire 1 according to the invention is of the type with a markedly flattened section. Preferably, the tire of the invention has a H/C ratio, of the height of the right cross-section to the maximum width of the section, ranging between 0.20 and 0.80. Preferably, the tire of the present invention is a tire having very low cross-section, e.g. with a ratio H/C of between 0.20 and 0.65, preferably from 0.25 to 0.45.

For the sake of clarity, in FIG. 1 the shoulder drops $SD_{in}$, $Sp_{out}$ for the inner tread portion and the outer tread portion have been shown enlarged (not in scale). According to the present invention, the shoulder drop difference $\Delta SD$ is from 0.30 mm to 1.30 mm, preferably from 0.40 mm to 1.20 mm, even more preferably from 0.60 mm to 1.10 mm.

As already stated hereinabove, the shoulder drops $SD_{in}$, $SD_{out}$ for the inner tread portion and the outer tread portion are determined on a tire mounted on a rim having a rim width as prescribed by the tire manufacturer, inflated at nominal inflation pressure and not subject to any load. A laser beam profile measurement device may be used to determine the shoulder drops $SD_{in}$ and $SD_{out}$, e.g. those produced by Dr. Noll GmbH (Germany) or by Bytewise Measurement Systems Corp. (USA). According to the invention, the maximum tire radius length is a length of tire radius measured at the equatorial plane.

Preferably, shoulder drops are measured in a static condition, namely when the tire is not rotating. As an alternative, shoulder drops could be measured at a rotation speed lower than about 50 Km/h.

The tire according to the present invention has an asymmetric tread pattern so as to have a ratio between the inner void/solid ratio $(V/S)_{in}$ and the outer void/solid ratio $(V/S)_{out}$ of from 1.10 to 1.50, preferably from 1.20 to 1.45, even more preferably from 1.30 to 1.40.

According to a preferred embodiment, the inner void/solid ratio $(V/S)_{in}$ is of from 0.30 to 0.60, preferably from 0.35 to 0.55, even more preferably from 0.38 to 0.45.

According to a preferred embodiment, the outer void/solid ratio $(V/S)_{out}$ is of from 0.15 to 0.45, preferably from 0.20 to 0.40, even more preferably from 0.25 to 0.35.

For further description of the invention, an illustrative example is given below.

Tires (tires A) according to the present invention were manufactured. In particular, two first tires A having a size of 225/40 ZR 18, were mounted on two respective 8JX18 rims and inflated at 2.3 bar. Two second tires A having a size of 265/35 ZR 18 were mounted on respective 9JX18 rims and inflated at 2.7 bar. Four tires (tires B), having the same size, the same structure and the same tread pattern of respective tires A, were manufactured. The two tires B having a size of 225/40 ZR 18, were mounted on two respective 8JX18 rims and inflated at 2.3 bar. The two tires B having a size of 265/35 ZR 18 were mounted on respective 9JX18 rims and inflated at 2.7 bar.

Tires A and tires B had the same asymmetric tread pattern having the following features:
inner void/solid ratio $(V/S)_{in}$=0.409
outer void/solid ratio $(V/S)_{out}$=0.303
$(V/S)_{in}/(V/S)_{out}$=1.35

The only difference was that tire A (invention) had an asymmetric tread profile, with a shoulder drop difference $\Delta SD$=0.70, whilst tire B (comparative) had a symmetric profile ($\Delta SD$=0).

A car Porsche 996 was first equipped with the above described four tires A, than it was equipped with the above described four tires B and used for testing aquaplaning and handling performance. The two tires having a size of 225/40 ZR 18 were mounted on the front axle. The two tires having a size of 265/35 ZR 18 were mounted on the rear axle.

The aquaplaning test around bends was carried out at a substantially constant speed along a road track with smooth and dry asphalt, having a bend with a constant radius (100 m) and with a final section flooded with a layer of water. The test was repeated at different speed values and for each test lateral acceleration was measured when running on the wet section by an accelerometer mounted on the car.

By comparing the curves lateral acceleration v. speed so obtained it was found that:
the maximum lateral acceleration is substantially the same for the two cars;
the speed at a substantially null lateral acceleration is about 6.6% higher for the car equipped with tires A than for the car equipped with tires B;
the integral of the curve (which is a measurement of the vehicle controllability during bending) is about 7.4% higher for the car equipped with tires A than for the car equipped with tires B.

For the handling test, the following characteristics were evaluated: i) steering promptness, ii) steering pull, and iii) maximum thrust along a bend. The tests were carried out with the same car as described above on a testing track. Table 1 sums up the test driver's score sheet for handling. The results of said tests are expressed as a score on an evaluation scale ranging from 0 to 10 representing the subjective opinion expressed by the test driver. The values reproduced in the following table represent a mean value between those obtained in several test sessions and given by different test drivers.

The steering promptness is indicative of the ability of a vehicle to recover its straight direction when the vehicle steering is subject to small rotations in the right and left directions.

The steering pull is indicative of the attitude of a vehicle to deviate from the straight direction, such an attitude being evaluated at a constant speed. The heading "steering pull", for the purposes of the present invention, further comprises "torque steer" which is indicative of the attitude of a vehicle to deviate from the straight direction, such an attitude being evaluated whilst the vehicle is accelerating.

The maximum lateral force along a bend is indicative of the amount of power which could be exercised by a vehicle which is driving along a bend. In turn, it depends on the area of the contact patch of the tires which are more loaded when the vehicle is driving along a bend.

TABLE 1

|  | Car with tires A | | | Car with tires B | | |
| --- | --- | --- | --- | --- | --- | --- |
| Speed | 80 [Km/h] | 160 [Km/h] | 220 [Km/h] | 80 [Km/h] | 160 [Km/h] | 220 [Km/h] |
| Promptness | 7.5 | 7.5 | 7.5 | 7.25 | 7.0 | 6.0 |
| Pull | 7.5 | 7.25 | 7.25 | 7.0 | 7.0 | 6.25 |
| Lateral force | 7.5 | 7.5 | 7.5 | 7.25 | 7.0 | 6.5 |

An analysis of the above results indicates that handling performance of a vehicle equipped with tires according to the present invention is improved at low speeds (80 Km/h) and that such an improvement is maintained even at high and very high speeds (160 and 220 Km/h).

The invention claimed is:

1. A pneumatic tire comprising:
a toroidal carcass structure comprising at least one carcass ply, said carcass structure comprising a crown portion and two axially opposite side portions, each associated with a respective bead structure for mounting the tire on a rim; a tread band in a position radially external to the carcass structure; a belt structure interposed between the carcass structure and the tread band; and a pair of sidewalls applied to the carcass structure in axially opposite positions,
wherein said tire has an equatorial plane which divides said tread band into an inner tread portion and an outer tread portion, said inner tread portion being positioned inwardly and said outer tread portion being positioned outwardly when the tire is mounted on said rim,
wherein said inner tread portion has an inner shoulder drop and said outer tread portion has an outer shoulder drop,
wherein said inner shoulder drop is measured as a difference between a maximum tire radius length and a length of tire radius in said inner tread portion at a distance, from said tire equatorial plane, corresponding to 40% of a rim width,
wherein said outer shoulder drop is measured as a difference between a maximum tire radius length and a length of tire radius in said outer tread portion at a distance, from said tire equatorial plane, corresponding to 40% of said rim width,
wherein said inner tread portion has an inner void/solid ratio and said outer tread portion has an outer void/solid ratio different from said inner void/solid ratio, and
wherein said tire has:
(i) an asymmetric tread profile so as to have a shoulder drop difference, calculated as a difference between said outer shoulder drop and said inner shoulder drop, of 0.30 mm to 1.30 mm; and
(ii) an asymmetric tread pattern so as to have a ratio between said inner void/solid ratio and said outer void/solid ratio of 1.10 to 1.50.

2. The tire according to claim 1, wherein said shoulder drop difference is 0.40 mm to 1.20 mm.

3. The tire according to claim 1, wherein said shoulder drop difference is 0.60 mm to 1.10 mm.

4. The tire according to claim 1, wherein said ratio between said inner void/solid ratio and said outer void/solid ratio is 1.20 to 1.45.

5. The tire according to claim 1, wherein said ratio between said inner void/solid ratio and said outer void/solid ratio is 1.30 to 1.40.

6. The tire according to claim 1, wherein said inner void/solid ratio is 0.30 to 0.60.

7. The tire according to claim 1, wherein said inner void/solid ratio is 0.35 to 0.55.

8. The tire according to claim 1, wherein said inner void/solid ratio is 0.38 to 0.45.

9. The tire according to claim 1, wherein said outer void/solid ratio is 0.15 to 0.45.

10. The tire according to claim 1, wherein said outer void/solid ratio is 0.20 to 0.40.

11. The tire according to claim 1, wherein said outer void/solid ratio is 0.25 to 0.35.

12. The tire according to claim 1, wherein said toroidal carcass structure is symmetric with respect to said equatorial plane.

13. The tire according to claim 1, wherein said maximum tire radius length is a length of tire radius measured at said equatorial plane.

14. The tire according to claim 1, wherein a ratio between a height of tire right cross-section and a maximum width of the tire is 0.20 to 0.80.

* * * * *

UNITED STATES PATENT AND TRADEMARK OFFICE
CERTIFICATE OF CORRECTION

| | | |
|---|---|---|
| PATENT NO. | : 8,499,806 B2 | Page 1 of 1 |
| APPLICATION NO. | : 12/085695 | |
| DATED | : August 6, 2013 | |
| INVENTOR(S) | : Bizzi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1420 days.

Signed and Sealed this
Tenth Day of February, 2015

Michelle K. Lee
*Deputy Director of the United States Patent and Trademark Office*